Nov. 23, 1937.     E. O. NORRIS     2,099,988
SPRAYING DEVICE
Original Filed April 16, 1931     3 Sheets-Sheet 2
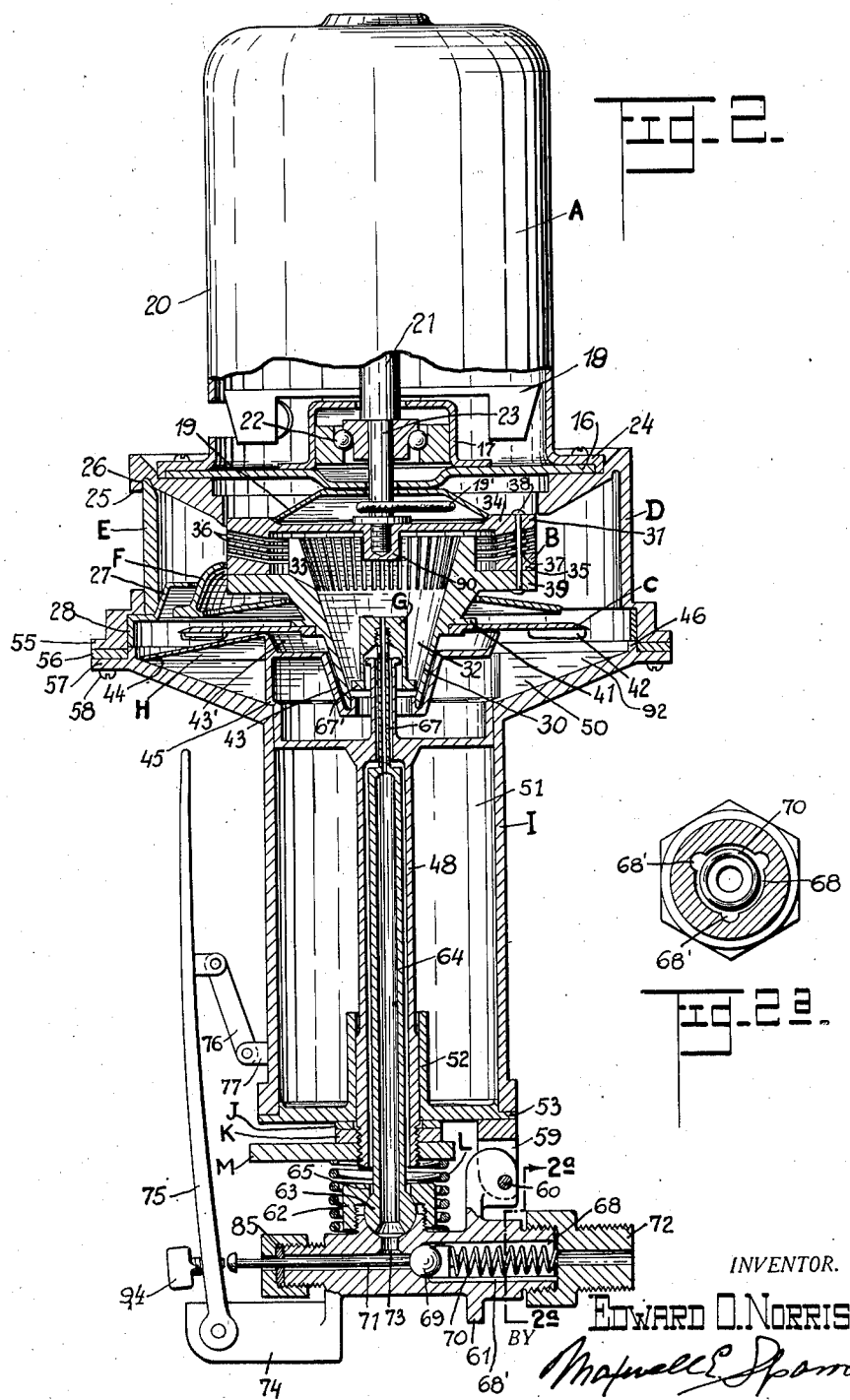

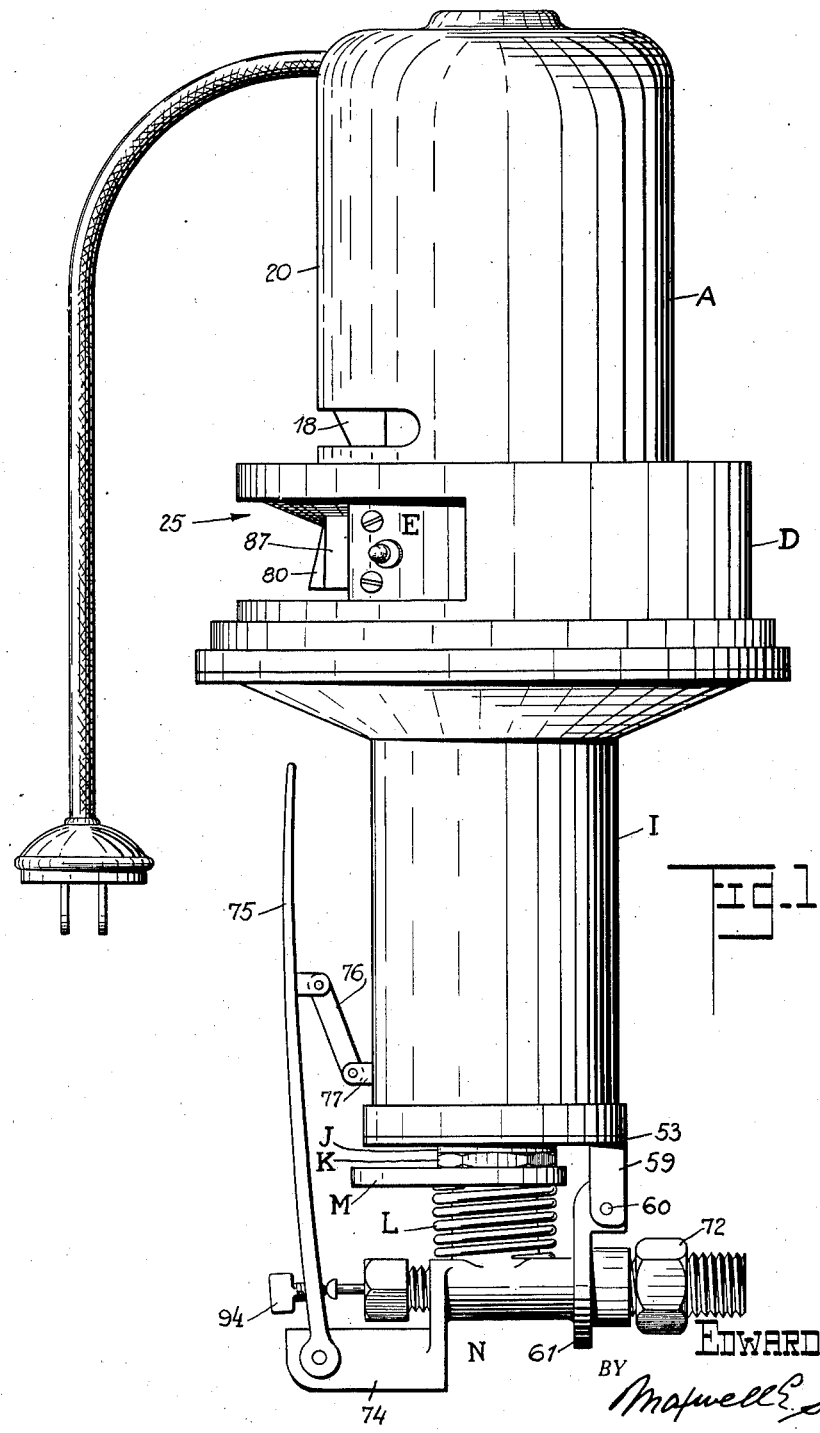

Nov. 23, 1937.　　　　E. O. NORRIS　　　　2,099,988
SPRAYING DEVICE
Original Filed April 16, 1931　　3 Sheets-Sheet 3
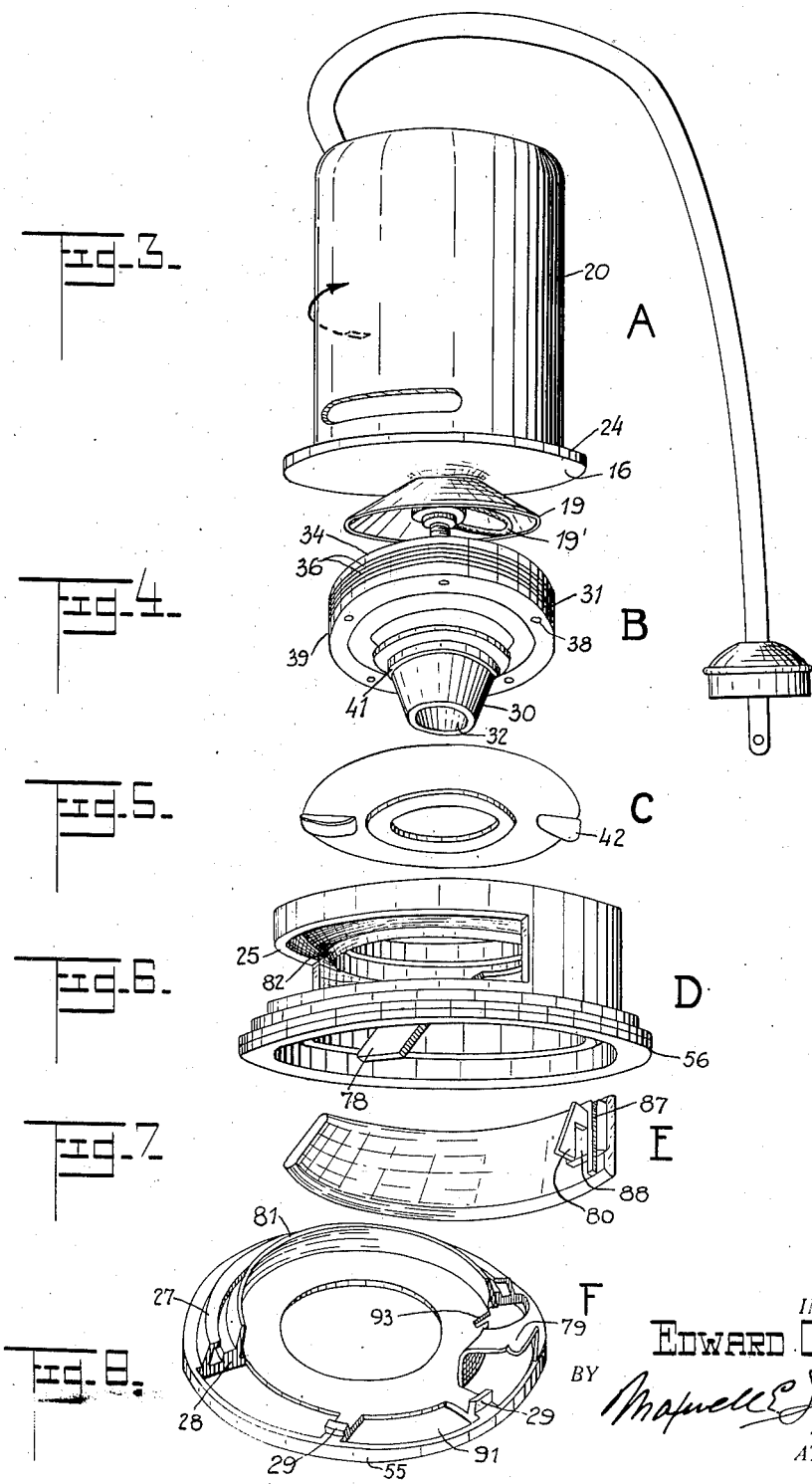
INVENTOR.
EDWARD O. NORRIS.
BY
ATTORNEY.

Patented Nov. 23, 1937

2,099,988

UNITED STATES PATENT OFFICE 2,099,988

SPRAYING DEVICE

Edward O. Norris, Port Chester, N. Y., assignor to The Norris Painting Machinery Corporation, Inc., New York, N. Y., a corporation of New York Application April 16, 1931, Serial No. 530,551
Renewed May 27, 1937

17 Claims. (Cl. 299—63)

My invention relates to spraying devices, is particularly adapted for spraying paints, lacquers, stains and varnishes, and embodies improvements over the invention described in my application for U. S. Letters Patent, filed September 5th, 1930, bearing Serial No. 479,900.

It is an object of the invention to provide a spraying device which is simple, economical and rapid in operation, characterized by its ability to throw the material in a fine, atomized spray and which is adaptable for use under a varied range of conditions, and which can be used for spraying different materials without requiring any delicate adjustments.

A further object of the invention is to produce a rotatable spraying device wherein the material fed therein is acted upon by centrifugal force and leaves the device on tangential planes.

A further object of the invention is to provide a spraying device having a distributor adapted to rotate at high speed, wherein the "break-up area" of the distributor is considerably increased without increasing the circumferential wall of the distributor.

A further object of the invention is in the provision of a spraying device having a high speed distributor, the said distributor being provided with an inner and an outer slotted circumferential wall wherein the slots in one wall are angularly disposed with respect to the slots in the other wall, by which the material fed into the distributor is delivered in the form of an impalpable spray.

A further object of the invention is to provide in a spraying device having a high speed rotatable distributor, means whereby the material which is fed into the distributor is deflected and spread uniformly over the entire, inner circumferential wall surface of the distributor.

A further object of the invention is to provide in a spraying device having a distributor rotatable within a casing, wherein part of the material fed into the distributor is ejected into the atmosphere and the remaining material deflected to the bottom of the distributor casing, means whereby the material thus deflected may be immediately returned to the distributor to become available for distribution again.

A further object of the invention is in the provision in such a device of means including manually operated means for facilitating the return to the distributor of the unused material which is thrown off by it, the said device, by manipulation of the said operated means, being adapted to function in a plurality of positions.

A further object of the invention is to provide in a spraying device having a distributor rotatable at high speed, means to cut down the air whip resulting from the high speed at which the distributor rotates.

A further object of the invention is to provide a spraying device wherein substantially all of the air is kept out thereof, thereby greatly increasing its mechanical efficiency.

A further object of the invention is to provide a spraying device having an encased high speed rotatable distributor and an opening in the casing wall, with means to feed a fluid in the form of a jet into the distributor, with means in the distributor whereby the fluid received by it is thrown out by centrifugal action within the casing in a swirl which is deflected by suitable means to the bottom of the casing, and through the casing opening in tangential planes in the form of a spray, with means for sharply cutting-off the stream of fluid at the casing opening to prevent the swirl of fluid continuing beyond the ends of the casing opening, which means also function to prevent any air which may be present within the casing from mixing with the spray, and with providing the distributor and casing with means whereby the unused material deflected to the bottom of the casing is returned to the distributor for further distribution.

A further object of the invention is to provide in such a device having a primary valve to feed in the material into the distributor, a secondary valve to allow the unused material to enter into the distributor, and means to automatically regulate the secondary valve in such manner that the secondary valve is opened before or at the time the primary valve is opened and to control the flow of secondary feed with relation to the flow of the primary feed; the secondary valve being automatically held closed when the machine is not in use.

Further objects and advantages of the invention will appear from the following disclosure thereof together with the attached drawings which illustrate a preferred form of embodiment thereof, and in which:—

Fig. 1 is a perspective view of the device.

Fig. 2 is another view of the device, the greater part thereof shown in section, with lever partly depressed.

Fig. 2a is a sectional view taken along the line 2a—2a of Fig. 2.

Fig. 3 is a perspective view of the driving means.

Fig. 4 is a perspective view of the distributor.
Fig. 5 is a perspective view of the paddle disc.
Fig. 6 is a perspective view of the casing body.
Fig. 7 is a perspective view of the gate.
Fig. 8 is a perspective view of the bottom of the casing.

In accordance with the invention, there may be provided a spraying device including a centrifugal distributor and a casing element surrounding the major portion of the distributor and formed with an opening through which liquid thrown from the distributor may pass to a surface to be coated, and providing a chamber for the non-ejected liquid and means for refeeding this liquid to the distributor.

Among the other features which may be provided in accordance with the invention are improved means for deflecting non-ejected liquid, improved feed control means, inner and outer distributor members each arranged to effectively alter the course of liquid being centrifugally propelled, associated transverse and circumferential distributor surfaces, a plurality of circumferential ejectment surfaces, a construction whereby the tendency toward the generation of air currents is reduced, etc.

In the drawings, the letter A represents the driving means which comprises an electric motor (not shown) completely shielded in a cover 20 to which is secured a plate 16. The reduced forward end 23 of the motor shaft 21 is supported in a thrust ball-bearing 22 which has its casing 17 secured to the plate 16. A fan 18 is rotatably mounted on the motor shaft 21.

The reduced extension 23 of the motor shaft 21 threadedly engages a distributor B. A cup 19 is interposed between the plate 16, and top of the distributor B, having a string 19' encircling the shaft 21 to prevent any of the fluid material entering the motor. Secured to the flange 24 of cover 20 by suitable means is a hollow cylindrical casing body D which encircles the distributor B. The casing body D has a wall opening 25 and is provided with a bottom F held in position when the device is assembled.

A circular gate or shutter E slidingly engages the casing body D and the casing bottom F whereby to control the actual opening of the device. The gate E is guided by a channel 26 in the casing body B and by the wall 27 of member 28 and the lugs 29 on the casing bottom F.

The distributor B comprises an inverted frusto-conical shaped hollow member 30 and a hollow cylindrical shaped member 31. The hollow 32 which extends the entire height of the member 30 is essentially frusto-conical, and the said member 30 is provided with a plurality of vertical slots 33 equally spaced around the upper portion of the member 30. The cylindrical member 31 of the distributor B comprises a top annular member 34, a bottom annular member 35 and a plurality of dished rings 36, the said rings being separated by washers 37 through which pass the bolts or rivets 38 which secure the member 34, the rings 36 and the bottom member 35 to an annular flange 39 forming an extension of the frusto-conical member 30. When the parts of the distributor are assembled a space exists between the conical member 30 and the cylindrical member 31. The lower portion of the frusto-conical member 30 extends through the casing body D and the bottom of the casing F. Secured to said member 30 by suitable means and on a flange 41 provided thereon, is a paddle disc C, the said paddle disc having a central opening through which the bottom member 30 of the distributor B projects.

The paddle disc C is provided with a plurality of paddles 42 for a purpose hereinafter stated and has its peripheral edge tapered so as to minimize air resistance when rotating. The lower end of the said frusto-conical member 30 projects within an opening 43' above the pocket 43 of the pocket member H. Extending from the opening 43' of the pocket member H is an element 44 resembling a segment or portion of the brim of an inverted saucer. The pocket member H is provided with an annular shoulder 45 which rests on the rim surrounding an opening 51 in the bottom of a chamber 50 forming an expansion of the stem I. The opening 51 runs through the stem. The arcuate edge of the element 44 snugly contacts with the chamber 50 adjacent its upwardly extending wall 46. The element 44 thereby providing a screen or cover over part of the chamber 50. The pocket member H is further provided with a sleeve 48 which projects through the hollow 51 of the stem I. The lower end of sleeve 48, is guided in a bearing formed by the inwardly projecting wall 52 of the stem cover 53. The extending end of stem 48 passes through a washer J and threadedly engages with a lock nut K. The lock nut K prevents the pocket member H from moving longitudinally. An arm M threadedly engages the end of the stem 48 by which the pocket member H may be manually rotated.

The upwardly extending annular flange or wall 46 of the expanded end of the stem I seats the downwardly extending annular flange 55 of the casing bottom F. Secured to the casing body D is a flange ring 56 which fits over the flange 46 and rests on the brim 57 on the end of the stem I to which it is secured by screws 58.

Pivotally secured to a lug 59 depending from stem I and by means of a bolt 60 is a member 61, being part of the valve operating means N. The member 61 and cap 62 are provided with sockets to receive the ball end 63 of a tube 64, the said cap threadedly engaging the member 61 and being provided with an annular central orifice 65 through which the tube 64 projects. The cap opening 65 and the opening in the tube 64 are in alinement whereby the tube is made to extend within the sleeve 48 of the pocket member H. A ball joint is thereby provided whereby as the member 61 is caused to be swung on the fulcrum 60, the tube 64 will be moved in a longitudinal direction.

The member 61 is provided with an orifice running longitudinally thereof, the said orifice being enlarged as shown at 68 to receive a ball 69 seated at the inner extremity thereof and normally held in this position by a compression spring 70 within the enlarged orifice and also by the pressure of the fluid material from the tank. A plurality of grooves 68' run parallel with the orifice 68, to allow the fluid to pass the ball when the valve is open. The ball 69 contacts with a valve stem 71 which projects through the reduced portion of the orifice and a packing gland 85 which threadedly engages with that end of said member 61. Threadedly engaging the other end of the member 61 is a coupling 72 provided with an orifice in alinement with the orifice in the member 61. The coupling 72 is adapted to receive communicating means from a tank having the material under pressure (not shown). The member 61 is provided with a flared orifice 73 by virtue of which the material fed through the valve may pass therethrough into the hollow of the tube 64. Pivotally secured to a lug 74 extending from the member 61 is a lever handle 75, the said handle also pivotally engaging a connecting link 76 which in turn is pivotally supported on a lug 77 projecting from the stem of the pocket member I. The lever handle 75 is adapted to engage the projecting end of the valve stem 71 when pressed inwardly.

The tube 64 has a reduced upper portion 66 guided in an opening in the pocket member H, which extends therethrough and projects within the distributor B to provide a nozzle 67. Threadedly engaging the end of the said nozzle within the distributor B is a valve cap G provided with a centrally located orifice in alinement with the hollow of the nozzle 67. The bottom of the valve cap G is flared at 67' to cover the opening in the bottom of the distributor which connects with the pocket opening 43' of the pocket 43.

The operation of the device is as follows:

The motor driving the distributor B is started. As the secondary feed is closed by the valve cap G, the unused material in the pocket 43 will not be driven up the frusto-conical member of the distributor B.

As the lever 75 is pressed inwardly, it first swings the member 61 upwardly about the fulcrum 60 whereby the tube 64 is made to move forward thereby causing the valve cap G to disengage from its seat on the bottom of the distributor B. Any unused material which might be in the pocket 43 will now ride up the frusto-conical surface into the distributor body. As the lever 75 is continued to be moved in the same direction, it engages the valve stem 71 whereby the fluid material is fed through the orifices into the tube 64 and out through the nozzle G to impinge on the boss 90.

A compression spring L encircling the cap 62 and abutting against the member 61 and the arm M automatically swings the member 61 to inoperative position when the lever arm 75 is released.

The fluid material which impinges on the boss 90 is deflected uniformly in all directions within the frusto-conical member of the distributor, and by centrifugal force produced by the distributor rotating at high speed, this fluid material is forced into the chamber 50 in fine sheets and thence broken-up by being forced through the slots in the cylindrical member of the distributor B. As the distributor rotates the unused material, that is, the material which does not pass through the casing opening 25 is thrown off from the distributor, hits the inside wall of the casing in a swirl and is deflected by the flanges or baffles 78, 79 and 80 to the bottom of the casing. From the bottom of the casing the fluid material passes through the openings 91 in the bottom F of the casing into the chamber 50 therebelow from which the fluid material enters the pocket 43 in the pocket member H, which forms the secondary feed, and by centrifugal force is driven up the inner wall of the frusto-conical member of the distributor B, and again distributed through the slots. In the event, that the device is to be used in a position other than vertical the pocket member H is rotated by means of the arm M so that the lateral opening 92 formed by the chamber 50 and element 44 is uppermost whereby the material may flow into the pocket 43 and then driven up to the distributor. The paddles 42 secured to the paddle disc C rotating with the distributor whisk the material from the bottom of the casing into the chamber 50 and into the member H.

To cut down the air whip due to the high speed at which the distributor is rotating, an arcuate upwardly projecting flange 81 forming an extension of the member 28 of the casing bottom F and a similar downwardly projecting arcuate flange 82 on the casing body D are provided. These flanges are disposed adjacent the casing opening 25 and adapted to encompass that portion of the periphery of the distributor which is adjacent the opening 25, the said flanges being so disposed with relation to the distributor B so that only the central portion of the outer wall of the distributor as it passes the opening 25 through which the spray is ejected, is freely opened to the atmosphere.

The flange 78 on the casing body D and the flange 80 on the gate E also provide cutting edges for cutting-off the swirl or stream of material and facilitates the material leaving the distributor through the opening 25 in tangential planes with respect to the distributor. The flange 78 also performs the function of preventing air currents created by the rapid rotation of the distributor from leaving the casing D at that point which air would otherwise mix with the spray ejected through the opening 25. The slidable gate E regulates the width of the opening 25 in the casing through which the spray is emitted. When the casing D and bottom F are assembled flange 78 engages the slot 93 in the bottom F.

The gate E is provided with a baffle plate 87 angularly disposed with relation to the flange 80 thereon, the flange 80 being cut-out as shown at 88. As hereinabove stated the flange 80 cuts-off the stream of material as the distributor enters the casing enclosure. This stream which is thus cut-off is carried with the inrushing air, impinges on the baffle plate 87 and is deflected through the opening 88 to the casing bottom.

As hereinbefore stated, the length of opening 25 is controlled by gate E. The shorter the length of this opening, the greater is the quantity of the unused material flowing into the pocket 43. The unused material should be drawn into the distributor at a greater rate than the new material. The set screw 94 operable in lever handle 75 for engagement with the head of valve stem 71, provides adjustable means to regulate or control the flow of the unused fluid material or secondary feed from pocket 23 into the distributor B with relation to the flow of the primary feed through valve 69.

To regulate the speed of the distributor motor a variable resistance is interposed in the motor circuit.

While I have shown and described a preferred form of embodiment of this invention I am well aware that other modifications may be made and I therefore desire a broad interpretation of the invention within the scope and spirit of the disclosure herein and the claims appended hereto. Reference is made to my co-pending application Serial No. 647,896, filed December 19, 1932, which is a continuation in part of the present case; and to my co-pending application Serial No. 700,207, filed November 29, 1933, which is a continuation in part of the present case; and to my co-pending application Serial No. 544,360, filed June 15, 1931, and to my co-pending application Serial No. 569,569, filed October 19, 1931.

Having thus described my invention, what I claim as new and desire to secure by Letters Patent, is:

1. In a spraying device, a casing having an opening at one side of the device, means providing a chamber within the casing, a revolvable apertured distributor in the casing to which the material is fed and from which it is discharged through the apertures, said opening being in the line of discharge of the distributor, means associated with the casing by which the used material is delivered through the casing opening in a spray and the unused material is deflected to the chamber, means within the casing to deliver the unused material from the chamber back into the distributor, a valve controlling the said delivery, and means including an element outside of said casing by which said valve is operated.

2. In a spraying device, a casing having an opening, means providing a chamber, a revolvable apertured distributor in the casing to which the material is fed and from which it is discharged through the apertures, means associated with the casing by which the used material is delivered through the casing opening in a spray and the unused material is deflected to the chamber, means to deliver the unused material from the chamber back into the distributor, a valve controlling the said delivery, and fan means to facilitate the flowing of the unused material into the chamber from the casing.

3. In a spraying device a casing having an opening, means providing a chamber, a revolvable apertured distributor in the casing to which the material is fed and from which it is discharged through the apertures, means associated with the casing by which the used material is delivered through the casing opening in a spray and the unused material is deflected to the chamber, a rotatable member forming with the chamber a pocket, means for rotating said member by which the opening to the pocket may be circumferentially shifted, and means to deliver the unused material from the pocket back into the distributor.

4. In a spraying device a casing having an opening, means providing a chamber, a revolvable apertured distributor in the casing to which material is fed and from which it is discharged through the apertures, means associated with the casing by which the used material is delivered through the casing opening in a spray and the unused material is deflected to the chamber, a rotatable member forming with the chamber a pocket, means for rotating said member by which the opening to the pocket may be circumferentially shifted, means to deliver the unused material from the pocket back into the distributor, a valve controlling the delivery of the unused material, and means by which said valve is operated.

5. In a spraying device, a revolvable distributor having discharge passages and a hollow projecting portion provided with a frusto-conical inside wall, a casing encircling the distributor and provided with a perforated portion, means providing a pocket, said projecting portion opening into said pocket, and a valve controlling the opening.

6. In a spraying device, a revolvable distributor having discharge passages and a hollow projecting portion provided with a frusto-conical inside wall, a casing encircling the distributor and provided with a perforated section, means providing a pocket adjacent said section, said projecting portion opening into said pocket, a valve controlling the opening, a valve controlling the feed into the distributor, and means automatically to close the first mentioned valve when the feed is cut off.

7. In a spraying device, a casing having an opening, a revolvable, apertured distributor formed with a chamber interior thereof, in the casing, means to feed the material into the distributor, the said material being discharged from the apertures by centrifugal force, means by which the material to be used is delivered through the casing opening in a spray, and the unused material is deflected within the casing, means to deliver the unused material back into the distributor, and means to regulate the flow of the unused material with relation to the flow of the feed, into the distributor.

8. In a spraying device a hollow rotatable distributor provided with openings in its circumferential wall through which the fluid leaves the distributor, a casing surrounding the said distributor, and having a side opening, said casing being provided with an upwardly and a downwardly projecting annular flange adjacent the opening of said casing, said flanges being arranged in close proximity to the said rotatable distributor.

9. In a spraying device a revolvable hollow cylindrical distributor provided with openings in its circumferential wall through which the fluid leaves the distributor, a stationary wall partly surrounding said circumferential wall, a movable wall slidably engaging said stationary wall and adapted to cover the remainder of said circumferential wall, flanges arranged at the exposed ends of the stationary and movable walls, and projecting into close proximity to said distributor, the flange at the end of the movable wall having a cut out, and another flange arranged adjacent the said latter flange at its cut out and angularly with respect thereto.

10. In a spraying device, a centrifugal distributor having a chamber interior thereof, a casing including an element partly surrounding the discharge portion of the distributor and providing an opening at one side of the device and in the direct line of discharge of the distributor for the centrifugal ejectment of liquid, means providing a collection chamber arranged to receive liquid discharged against said surrounding element, means rotatable with respect to said chamber within the casing for delivering liquid from said chamber interiorly of said distributor, and control means associated with the last mentioned means.

11. In a spraying device, a centrifugal distributor having a chamber interior thereof, a casing including an element partly surrounding the discharge portion of the distributor and providing an opening at one side of the device and in the direct line of discharge of the distributor for the centrifugal ejectment of liquid, means providing a collection chamber arranged to receive liquid discharged against said surrounding element, means rotatable with respect to said chamber within the casing for delivering liquid from said chamber interiorly of said distributor, and manually operable means including a valve for controlling said delivery.

12. In a spraying device, a centrifugal distributor having a chamber interior thereof, a casing including an element partly surrounding the discharge portion of the distributor and providing an opening at one side of the device and in the direct line of discharge of the distributor for the centrifugal ejectment of liquid, means providing a collection chamber disposed axially of the distributor and arranged to receive liquid discharged against said surrounding element, means within the casing for delivering liquid from said chamber interiorly of said distributor, means for supplying additional liquid to said distributor and means for simultaneously closing the delivery and supply means.

13. In a spraying device, a centrifugal distributor having a chamber interior thereof, a casing including an element partly surrounding the discharge portion of the distributor and providing an opening at one side of the device and in the direct line of discharge of the distributor for the centrifugal ejectment of liquid, means providing a collection chamber arranged to receive liquid discharged against said surrounding element, means to deflect into said chamber material discharged against said casing element, means within the casing for delivering liquid from said chamber interiorly of said distributor, means for supplying additional liquid to the distributor, and valve means for controlling the delivery at the will of the operator.

14. In a portable spray coating device, a centrifugal distributor, a casing including an element partly surrounding the discharge portion of the distributor and providing an opening for the centrifugal ejectment of liquid, and means providing a collection chamber arranged to receive liquid discharged against said surrounding element, said distributor comprising a portion having a frusto-conical inner surface and extending sufficiently within said chamber to feed liquid therefrom.

15. In a spraying device, a centrifugal distributor, means partly surrounding said distributor, means for collecting and redelivering liquid discharged against said surrounding means, means for supplying additional liquid to said distributor, means to control said redelivery means and said supply means, and a common actuator member for said control means.

16. In a spraying device, a centrifugal distributor, means partly surrounding said distributor, means for collecting and re-delivering liquid discharged against said surrounding means, means for supplying additional liquid for use by said distributor, means to control said re-delivery means and said supply means, and a common actuator member for said control means.

17. A painting device comprising, in combination, a centrifugal distributor made up of an inner and an outer member, the said inner member being hollow and having a paint-receiving chamber interiorly thereof and provided with openings in its circumferential wall through which the paint leaves the chamber, the outer distributor member also being provided with openings disposed in planes approximately at right angles to the openings in the inner member for passage from the distributor of paint ejected through the openings in the inner member, a casing including an element partly surrounding the discharge portion of the distributor and providing an opening at one side of the device and in the direct line of discharge of the distributor for the centrifugal ejectment of paint, means providing a collection chamber arranged to receive paint discharged against the said surrounding element, means to deflect into the said chamber paint discharged against the said surrounding element, and means rotatable with respect to the said chamber within the casing for delivering paint from the said chamber interiorly of the said distributor.

EDWARD O. NORRIS.